United States Patent [19]
Bottrell et al.

[11] Patent Number: 5,790,356
[45] Date of Patent: Aug. 4, 1998

[54] TRANSFORMER PROTECTION SYSTEM FOR PROTECTING SOURCE TRANSFORMERS FROM ILL EFFECTS OF ZERO-SEQUENCE CURRENTS

[76] Inventors: Gerald W. Bottrell, 2442 Teasley St., La Crescenta, Calif. 91214; Luke Y. Yu, 2173 E. California Blvd., San Marino, Calif. 91108

[21] Appl. No.: 720,948

[22] Filed: Oct. 4, 1996

Related U.S. Application Data

[63] Continuation-in-part of Ser. No. 322,229, Oct. 13, 1994.
[51] Int. Cl.$^6$ .................................................. H02H 3/00
[52] U.S. Cl. ........................ 361/35; 361/93; 361/115
[58] Field of Search .............................. 361/35, 93, 115, 361/62, 64, 66, 37, 38

[56] References Cited
U.S. PATENT DOCUMENTS 3,678,338  7/1972  Beachley .............................. 317/18 R Primary Examiner—Brian K. Young
Assistant Examiner—Stephen W. Jackson
Attorney, Agent, or Firm—David & Raymond; Raymond Yat C. Chan

[57] ABSTRACT

A conversion of a three-phase, four-wire power system to divert all zero-sequence current from the power system grounded-neutral source transformer and its phase and neutral conductors. A zero-sequence filter transformer such as a zig-zag transformer is installed, and the system neutral conductor and ground point are relocated from the neutral terminal of the source transformer to that of the zero-sequence filter transformer. A protection scheme operates to trip a main circuit breaker for zero-sequence filter transformer overloads or short circuits. The source transformer and its neutral circuit are thereby protected from the ill effects of zero-sequence currents.

20 Claims, 7 Drawing Sheets

TABLE A

SAMPLE PERFORMANCE COMPARISON

Calculated Performance of Present Invention Versus the Prior Art
Source Transformer ... 150 kVA,   3% Impedance
Zig-Zag Transformer .. 36 kVA,  1.5% Impedance (Prior Art)
                       72 kVA, 3.24% Impedance (present Inv.)
Feeder Cable ........ Source to Dist. Pnl ..... 80 Ft.
( 2 # 4 / 0  per Phase)  Zig-Zag to Dist. Pnl .... 10 Ft.

UNBALANCED LOAD OF FUNDAMENTAL FREQUENCY
(Zero Load on Phase A)

CURRENT FLOW IN PERCENT OF SOURCE TRANSFORMER FULL-LOAD CURRENT

| BRANCH* CURRENT | PRIOR ART | PRESENT INVENTION |
|---|---|---|
| Load Current | | |
| $I_{a1}$ | 0 | 0 |
| $I_{b1}$ | 100 | 100 |
| $I_{c1}$ | 100 | 100 |
| $I_{n1}$ | 100 | 100 |
| Zig-Zag Current | | |
| $I_z$ (per leg) | 17.3 | 33.0 |
| Source Current | | |
| $I_{as}$ | 17.3 | 33.0 |
| $I_{bs}$ | 95.8 | 88.4 |
| $I_{cs}$ | 89.6 | 88.4 |
| $I_{ns}$ | 50.1 | 0 |

3RD HARMONIC CURRENTS FROM NON-LINEAR LOADS
(50% 3rd Harmonic, Constant Current)

CURRENT FLOW IN PERCENT OF SOURCE TRANSFORMER FULL-LOAD CURRENT

| BRANCH* CURRENT | PRIOR ART | PRESENT INVENTION |
|---|---|---|
| Load Current | | |
| $I_{a1}$ | 50 | 50 |
| $I_{b1}$ | 50 | 50 |
| $I_{c1}$ | 50 | 50 |
| $I_{n1}$ | 150 | 150 |
| Zig-Zag Current | | |
| $I_z$ (per leg) | 23.8 | 50 |
| Source Current | | |
| $I_{as}$ | 26.2 | 0 |
| $I_{bs}$ | 26.2 | 0 |
| $I_{cs}$ | 26.2 | 0 |
| $I_{ns}$ | 78.6 | 0 |

* Refer to Fig. 2 for identification of branch currents.

FIG. 7

TRANSFORMER PROTECTION SYSTEM FOR PROTECTING SOURCE TRANSFORMERS FROM ILL EFFECTS OF ZERO-SEQUENCE CURRENTS

This application is a continuation-in-part application of application Ser. No. 08/322,229, filed Oct. 13, 1994, for Zero-Sequence Current Suppressor.

BACKGROUND OF THE PRESENT INVENTION

The present invention relates to transformer protection system, and more particularly to a transformer protection system and process for protecting source transformers from ill effects of zero-sequence currents.

The application of nonlinear electrical devices has increased dramatically in recent years and promises to increase even further in the future. Typical of such nonlinear devices are electronic computers and other switched-mode power equipment. These devices tend to pollute the power systems from which they are fed by introducing harmonic currents and voltages of various frequencies and magnitudes.

Referring to FIG. 1 of the drawings, a conventional three-phase, four-wire power system is illustrated. The system is supplied from a high-voltage source 1 via a grounded-neutral source transformer 2, having a set of high-voltage windings 2a and a set of low-voltage windings 2b having a secondary neutral point 2c. The neutral point 2c is connected to a source neutral terminal 2e through a source neutral connection 2d. Extending from the source neutral terminal 2e are a ground connection 2f to ground point G and a first segment of neutral conductor 6. A four-wire distribution system 4 having three conduction lines A, B, C. A second segment of neutral conductor N which is connected with the first segment of neutral conductor 6 is connected to a system of loads 3 which comprises a plurality of single-phase load elements 3a, 3b, 3c connected from the conduction lines A, B, C to the second segment of neutral conductor N via a load neutral terminal 3d. (Practically, the neutral conductor 6N is not necessarily split into the two segments 6 and N as shown, but is depicted as such in order to better visualize the changes required in accordance with the present invention.) The three-phase, four-wire system is switched via a main circuit breaker comprising source transformer primary three-pole circuit breaker 9 and/or a secondary three-pole circuit breaker 8. The single-phase load elements 3a, 3b, 3c are protected and switched by a plurality of single-pole circuit breakers 7a, 7b, 7c respectively.

If the single-phase loads 3a, 3b, 3c are not perfectly balanced on each of the three phases A, B, C or if the loads are non-linear and so produce triplen harmonics, zero-sequence currents will flow in the neutral conductor 6N and the source transformer secondary windings 2b and will circulate around the delta-connected primary windings 2a. While all such currents produce heat in windings and conductors, the harmonic currents produce more heat per ampere than does the fundamental current, thus making their presence particularly harmful wazzu to the neutral conductor 6N and the source transformer 2.

Harmonic currents and voltages, generally characterized as harmonics, are multiples of the 50- or 60-Hz fundamental power frequency. The odd harmonics (3rd, 5th, 7th, etc.) are of primary importance as they are the ones most likely to be produced by single-phase nonlinear electrical equipment and they are the ones most detrimental to the power systems which feed the non-linear loads. Those odd harmonics which are divisible by three (3rd, 9th, 15th, etc.) are called triplen harmonics. In a three-phase system, the triplen harmonics produce three currents (one each phase) which are in phase with each other and thus add together directly in the neutral conductor.

When analyzed by a method of symmetrical components, the triplen harmonics are considered zero-sequence currents, as all currents of this type are in phase with each other. The three-phase, four-wire power systems therefore will experience the following zero-sequence currents:

1. Zero-sequence currents resulting from unbalanced line-to-neutral loads of fundamental and harmonic frequencies.
2. Zero-sequence currents resulting from unbalanced line-to-neutral non-linear loads which produce harmonic currents of any order.
3. Zero-sequence currents resulting from balanced line-to-neutral, non-linear loads which produce triplen harmonic currents.

Zero-sequence currents of all these types will flow in the neutral conductor and return through the windings of a source transformer. They will add directly in the power system neutral and the neutral terminals of the source transformer. These conditions have resulted in the neutral conductors carrying up to twice the rms current of the phase conductors. Consequently, in some cases, overheating, fires and other failures have occurred in neutral conductors and their terminations; and the source transformers have overheated and failed prematurely from the effects of the zero-sequence currents.

The above conditions are best avoided through careful design of the non-linear load devices, including the use of input filters on such devices. However such safeguards are often difficult or impossible to carry out, especially in large general use commercial buildings and certain industrial plants. In such cases, the following measures have been used to guard against overheating of the source transformers and neutral conductors.

1. The use of oversize or especially-designed source transformers (having so-called K factors) can be effective, through expensive, for new installations where the size and nature of the non-linear loads is predictable throughout the life of the installation.

2. For existing installations, tuned filters made up of reactors and capacitors are sometimes used to alleviate the effects of harmonics on the power system. However, they are relatively expensive, only partially effective, and they present the danger of resonance with some future or unexpected harmonic source.

3. The use of active electronic circuitry whereby harmonic currents are injected into the system can cancel the harmonics generated by the non-linear loads. This method is often used together with zero-sequence filter (zig-zag) transformers. It can be made highly effective but its cost is very high and its use tends to reduce reliability of the system as a whole.

4. Shunt-type zero-sequence filter (zig-zag) transformers have been used successfully to divert from the neutral and source transformer some portion of the zero-sequence current flowing in the power system. Such a conventional protection system is designed to partially divert zero-sequence currents from a wye-connected source transformer having its neutral point solidly grounded. The source transformer supplies single-phase loads over a 3-phase, 4-wire distribution system having a continuous neutral conductor extending from the source transformer neutral point to the neutral terminals of the load devices. A zig-zag filter transformer is connected in shunt, across the load devices, with its neutral point tapped into the neutral conductor of the 3-phase, 4-wire distribution system, thus providing two paths for the flow of zero-sequence currents: one through the source transformer and one through the zig-zag transformer.

This method is often economical, as the filter must carry only the zero-sequence current diverted from the source transformer. However, as presently applied, the method has been only about 50 percent effective in diverting zero-sequence currents from the source transformer and its neutral. The zero-sequence filter transformer installed in the conventional manner described above must be designed to carry continuously only that portion of the total zero-sequence current which the system is capable of diverting from the source transformer. In most cases the diverted current is about half that generated by the loads. Moreover, since the line-to-ground short-circuit current is limited primarily by the impedance of the source transformer and the filter transformer in parallel, the short-circuit current will be increased wherever a filter transformer is installed in such a manor. The amount of increase normally will be appreciable, as the ability of such a conventional system to divert zero-sequence currents is improved as the impedance of its filter transformer is reduced. In other words, as its filtering performance is improved, its short-circuit current is increased. Such an increase in short-circuit current could represent a major drawback to the use of this conventional system, as circuit breakers or fuses might have to be replaced in order to accommodate the increased current.

U.S. Pat. No. 3,678,338 discloses an ungrounded power system with a protective grounding device (shunt type) in the circuit. However, the purpose and function of such a system is to provide a system ground to an otherwise ungrounded system. Its purpose is not to act as a filter for zero-sequence currents, as no such currents flow during normal operations. It does provide a path for such currents which flow as a result of short circuits involving ground. Under such conditions, the ground path normally is quickly interrupted and the system continues to operate ungrounded until the short circuit is detected and removed. In the case of very minor ground faults, the ground path may not be interrupted.

Its zero-sequence filter transformer is selected to carry, for a short time only, the maximum short circuit involving ground. It must carry continuously only those minor, nuisance ground faults which do not adversely effect normal operations.

SUMMARY OF THE PRESENT INVENTION

The main object of the present invention is to provide a transformer protection system for protecting source transformers from ill effects of zero-sequence currents which provides a novel arrangement for incorporating a grounded shunt-type zero-sequence filter transformer with a four-wire power system having a source transformer connected with a system of loads, in which a neutral connection between the filter transformer and the source transformer is eliminated for blocking the flow of neutral current (zero-sequence current) in that portion of the circuit. Therefore, the present invention eliminates the flow of zero-sequence current in the source transformer and that portion of the neutral circuit. Damaging triplen harmonics and unbalanced-load currents of all frequencies are thereby prevented from flowing in the source transformer and its neutral circuit.

Another object of the present invention is to provide a transformer protection system for protecting source transformer from ill effects of zero-sequence currents, wherein all zero-sequence current is blocked from the source transformer regardless of the impedance of its filter transformer. Its impedance may therefore be independently selected so as not to increase system short-circuit current. Furthermore, the present invention roughly doubles the effectiveness of the prior art, while avoiding potential serious short-circuit problems. The present invention can be accomplished at a moderate increase in cost over the prior arts.

Another object of the present invention is to provide a transformer protection system for protecting source transformers from ill effects of zero-sequence currents which is specified to apply to systems supplied from grounded-wye connected source transformers.

Another object of the present invention is to provide a transformer protection system for protecting source transformers form ill effects of zero-sequence currents which can provide overload and short-circuit protection of the filter transformer, arranged to trip the system main circuit breaker since it is unsafe to switch off the filter transformer alone, as the neutral circuit would then be ungrounded and the single-phase loads would be subjected to dangerous over-voltages.

Another object of the present invention is to provide a process for converting a conventional grounded-neutral source transformer of a power system to a protected system for eliminating the flow of zero-sequence current in the source transformer and that portion of the neutral circuit otherwise connected to the source transformer.

BRIEF DESCRIPTION OF THE DRAWINGS

FIG. 7 is a comparison table A illustrating the performance of the present invention versus the closest prior art.

DETAILED DESCRIPTION OF THE PREFERRED EMBODIMENT

Figure 1:
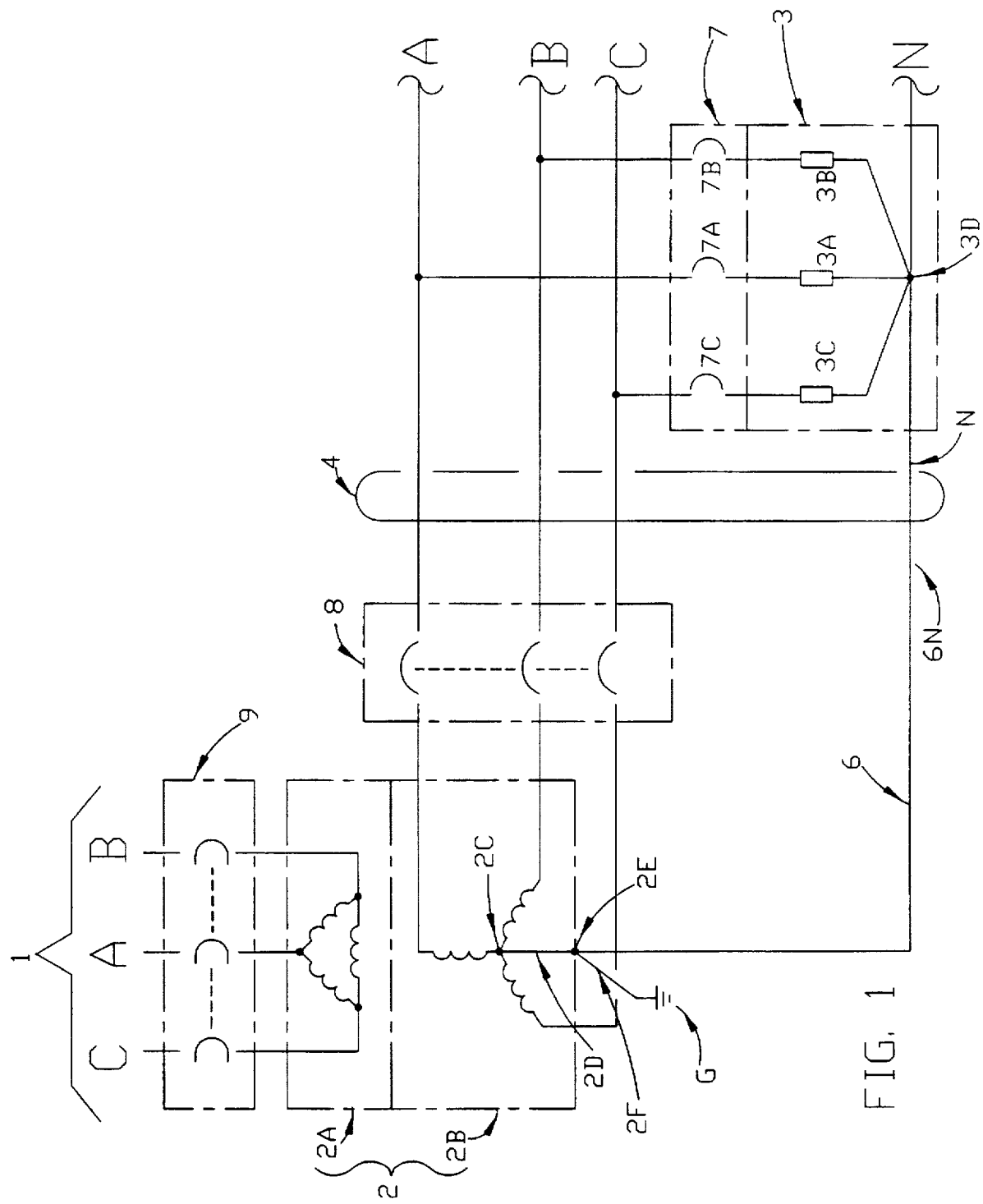
FIG. 1 is a circuit diagram of an existing conventional installation of a source transformer.
Figure 2:
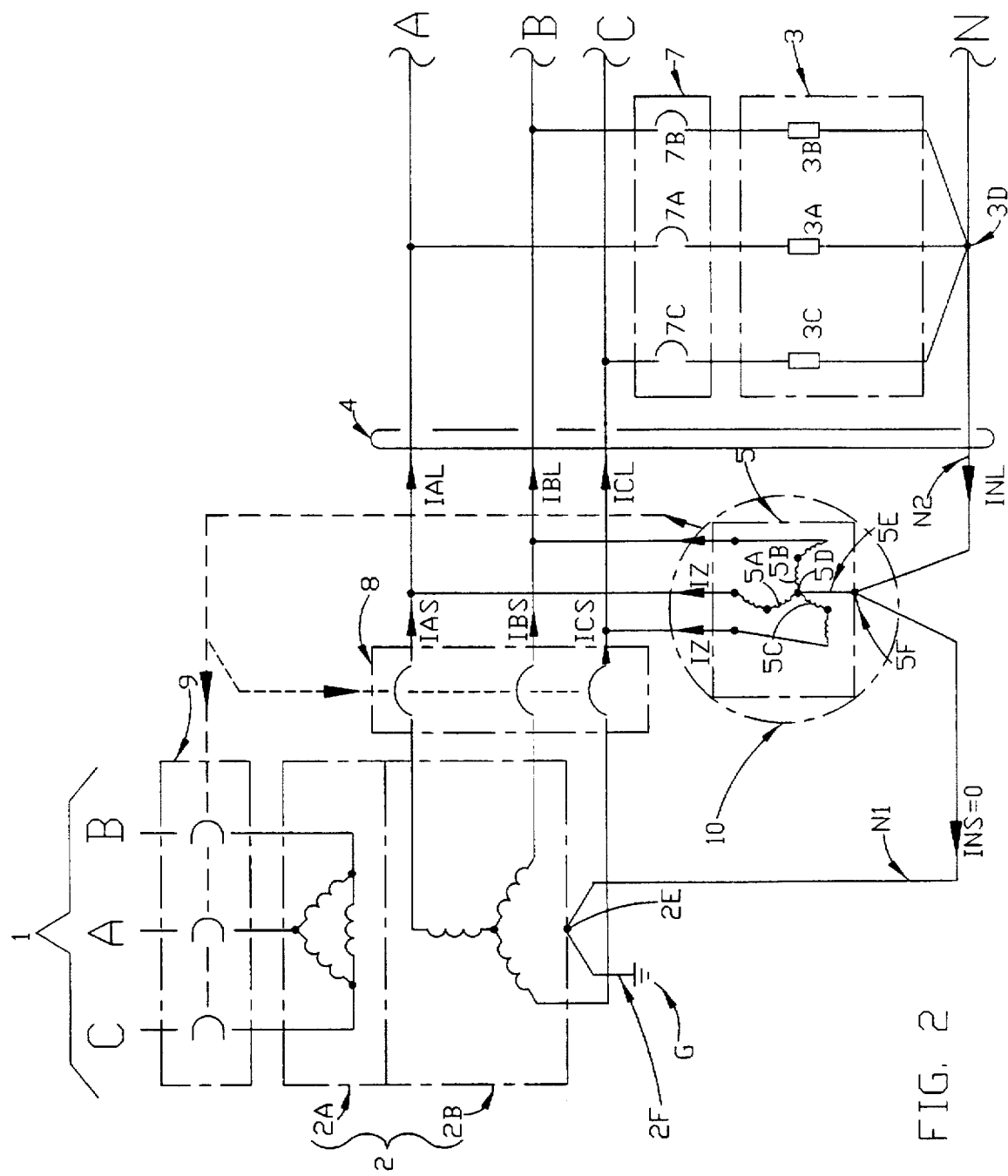
FIG. 2 is a circuit diagram of a first preferred embodiment of the present invention.

Referring to FIG. 2, a transformer protection system for a three-phase, four-wire power system being converted from the conventional power system circuit as shown in FIG. 1 in accordance with a first preferred embodiment of the present invention is illustrated.

The system is supplied from a high-voltage source 1 via a grounded-neutral source transformer 2, having a set of high-voltage windings 2a and a set of low-voltage windings 2b having a secondary neutral point 2c. A four-wire distribution system 4, having three conduction lines A, B, C and a neutral conductor N, connects the source 2 to a system of loads 3 which comprises a plurality of single-phase load elements 3a, 3b, 3c connected from the conduction lines A, B, C to the neutral conductor N via a load neutral terminal 3d. The three-phase, four-wire system is switched via a main circuit breaker comprising source transformer primary three-pole circuit breaker 9 and/or a secondary three-pole circuit breaker 8. The single-phase load elements 3a, 3b, 3c are protected and switched by a plurality of single-pole circuit breakers 7a, 7b, 7c respectively.

A zero-sequence filter transformer 5, represented here as a zig-zag transformer, having three segmented phase windings 5a, 5b, 5c and a filter neutral point 5d is connected in shunt across the electrical load elements 3a, 3b, 3c. The filter transformer 5 is adapted to safely carry continuously all zero-sequence current produced by the electrical load elements 3a, 3b, 3c including harmonic currents generated by non-linear loads and currents of all frequencies resulting from unbalanced loading of the phases. The filter neutral point 5d of the filter transformer 5 is connected to a filter ground terminal 5f via a filter neutral connection 5e. The neutral conductor N is connected to the filter ground terminal 5f which is connected to ground.

Figure 3:
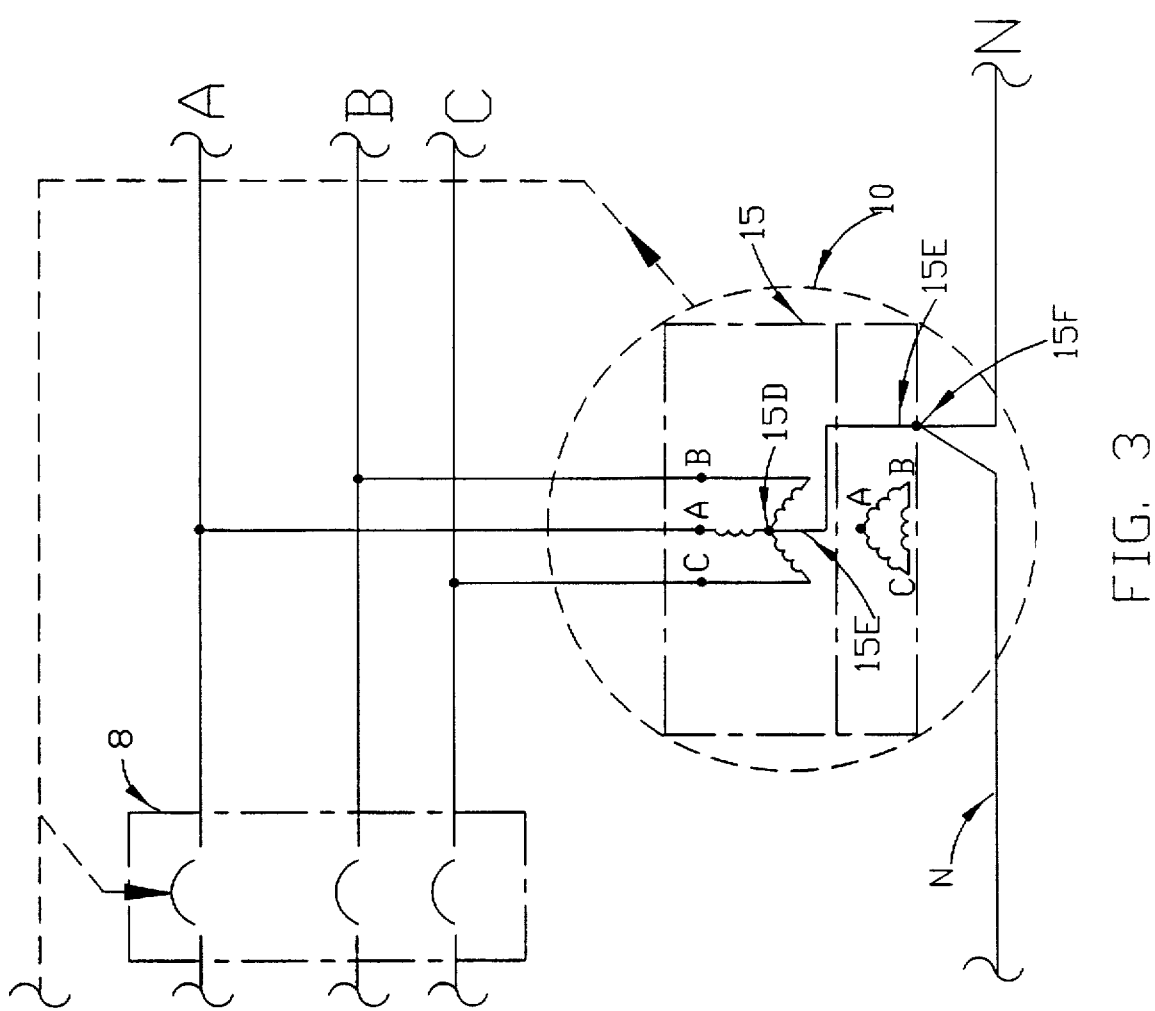
FIG. 3 is a partial circuit diagram of a second preferred embodiment according to the present invention.

Referring to FIG. 3, a transformer protection system according to a second preferred embodiment of the present invention is illustrated, which is the same as that of the first embodiment as shown in FIG. 2, except the zero-sequence filter transformer 5 is a wye-delta transformer 15. In this second embodiment, a delta-connected secondary winding 15b provides a path for the zero-sequence currents to flow and therefore functions much the same as the zig-zag filter transformer of the first embodiment. However, in general, the zig-zag filter transformer is superior to the wye-delta filter transformer in that its cost is lower and it is capable of being constructed with lower impedance to zero-sequence current.

Figure 4:
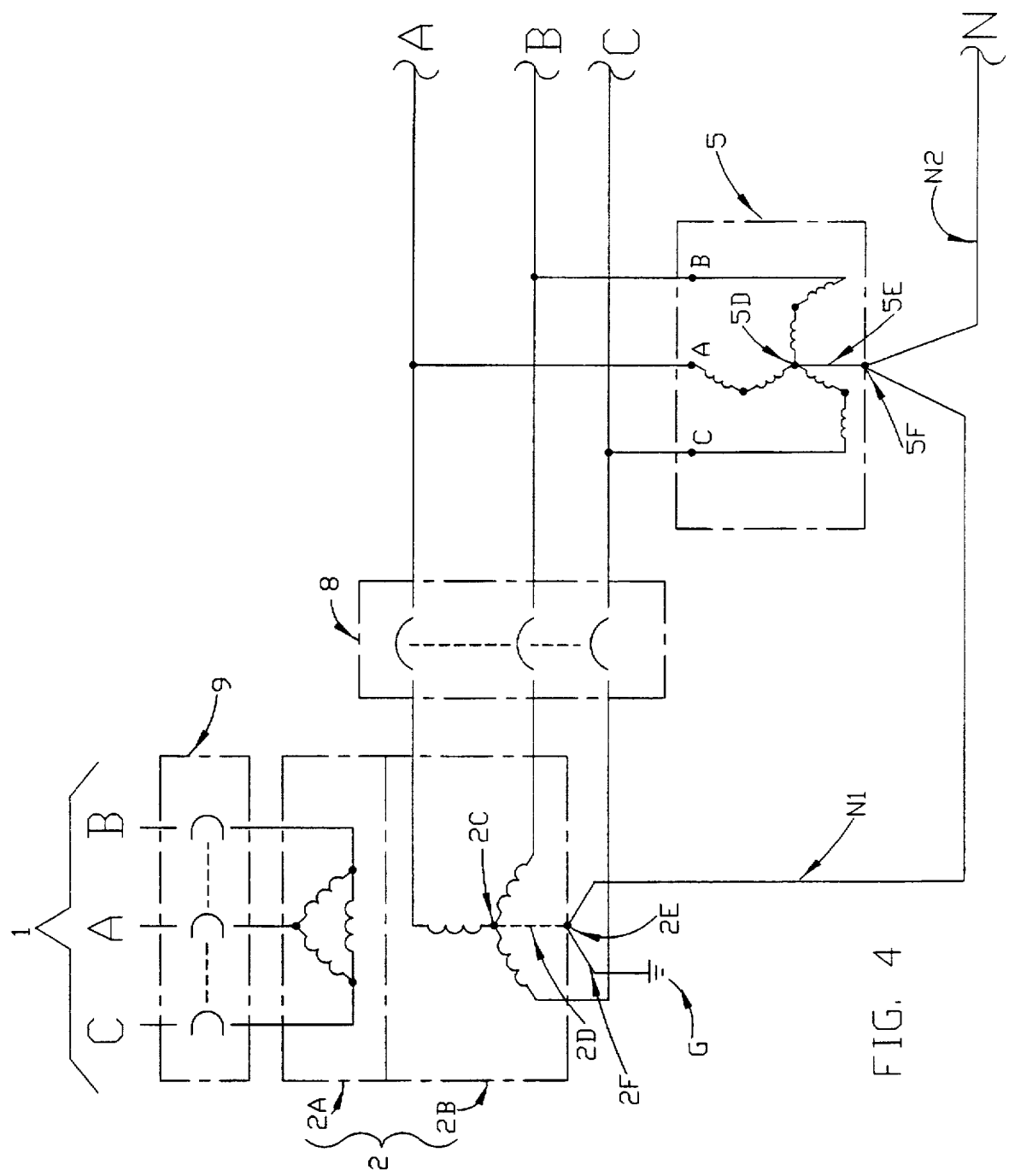
FIG. 4 is a partial circuit diagram showing a first alternative connection for the proposed invention, which is applicable to either the first or second preferred embodiment, with wiring to be disconnected or removed shown as dotted lines.

The above transformer protection system, as disclosed in the above first and second embodiments, can be achieved by a converting process of the existing conventional system installed in buildings or industrial plants, etc., in which the source transformer 2 is a grounded-neutral source transformer wherein the source neutral point 2c is grounded to a source ground G via a source neutral connection 2d, a source ground terminal 2e, and a source ground connection 2f, and connected to the load neutral terminal 3d via the neutral conductor N, as shown in FIG. 1. Referring to FIGS. 1, 2 and 4, such a conversion can be completed by a converting process comprising the following steps:

(1) Connect a zero-sequence filter transformer 5 having three segmented phase windings 5a, 5b, 5c in shunt across the electrical load elements 3a, 3b, 3c. The filter transformer 5 is adapted to safely carry continuously all zero-sequence current produced by the electrical load elements 3a, 3b, 3c including harmonic currents generated by non-linear loads and currents of all frequencies resulting from unbalanced loading of the phases. A filter neutral point 5d of the three segmented phase windings 5a, 5b, 5c of the filter transformer 5 is connected to a filter ground terminal 5f via a filter neutral connection 5e.

(2) Connect a first segment and a second segment N1, N2 of the neutral conductor N to the filter ground terminal 5f of the zero-sequence filter transformer 5, in which the first segment N1 of the neutral conductor N is connected to the source ground terminal 2e and the second segment N2 of the neutral conductor N is connected to the load neutral terminal 3d.

(3) Disconnect the source neutral connection 2d between the source neutral point 2c and the source ground terminal 2e. As shown in FIG. 4, the source neutral connection 2d, illustrated in dotted lines, is thereby removed, thus electrically moving the neutral ground from the grounded-neutral source transformer 2 to the zero-sequence filter transformer 5. However, the physical ground point G has not been moved so that the source transformer case ground and that of other non-current carrying parts of existing electrical equipment can be retained.

(4) Operatively connect a zero-sequence filter transformer protection scheme to the power system for tripping a main circuit breaker 8 or 9 of the power system when an abnormal condition is detected.

Figure 5:
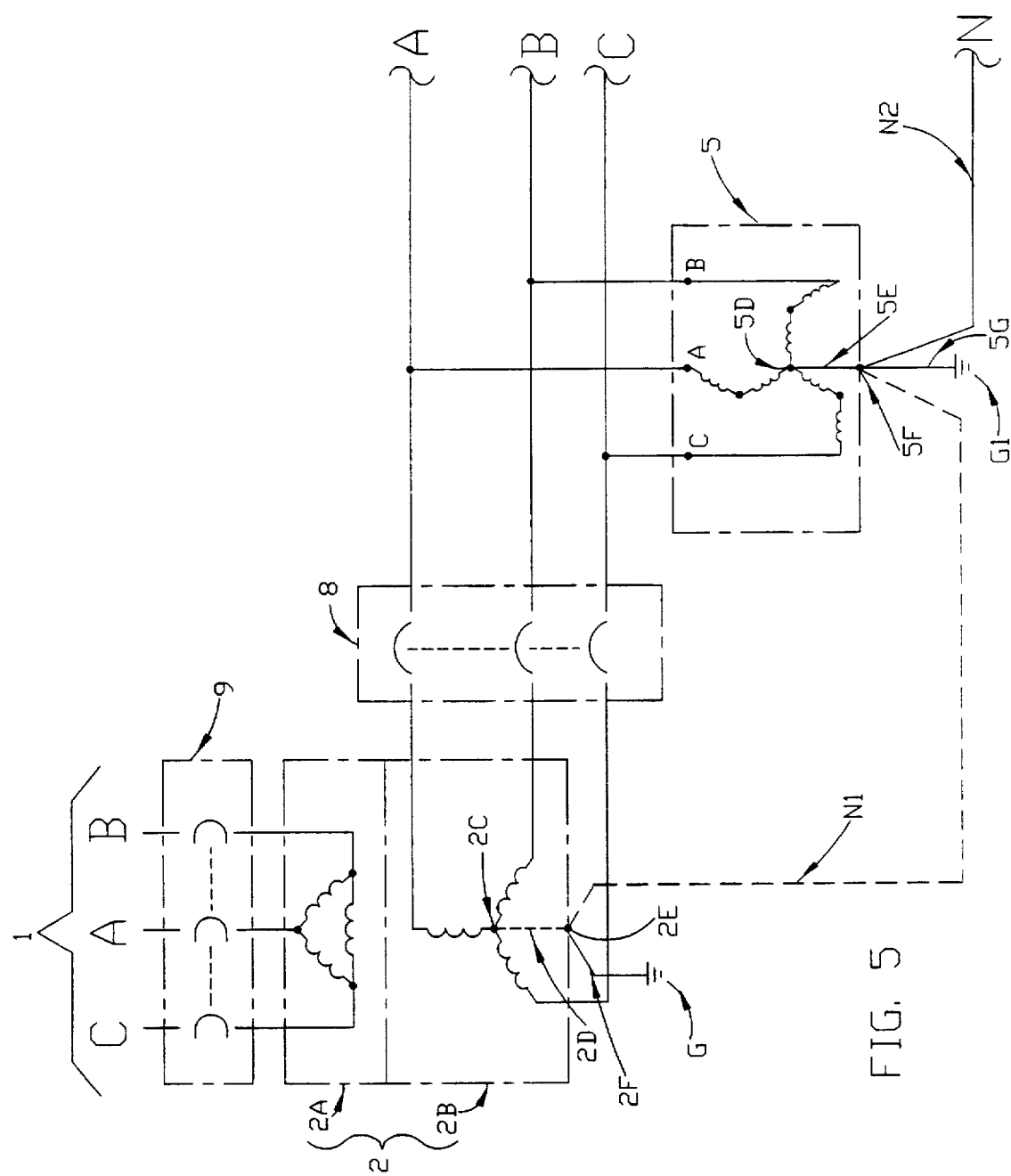
FIG. 5 is a partial circuit diagram showing a second alternative connection for the proposed invention, which is applicable to either the first or second preferred embodiment, with wiring to be disconnected or removed shown as dotted lines.

Referring to FIGS. 1, 2 and 5, an alternative converting process of the present invention comprises the following steps:

(1) Connect a zero-sequence filter transformer 5 having three segmented phase windings 5a, 5b, 5c in shunt across the electrical load elements 3a, 3b, 3c. The filter transformer 5 is adapted to safely carry continuously all zero-sequence current produced by the electrical load elements 3a, 3b, 3c including harmonic currents generated by non-linear loads and currents of all frequencies resulting from unbalanced loading of the phases. A filter neutral point 5d of the three segmented phase windings 5a, 5b, 5c of the filter transformer 5 is connected to a filter ground terminal 5f via a filter neutral connection 5e.

(2) Connect the filter ground terminal 5f of the zero-sequence filter transformer 5 into the neutral conductor N, so that the neutral conductor N is divided into a first segment N1 of the neutral conductor N connecting between the filter ground terminal 5f and the source ground terminal 2e and a second segment N2 of the neutral conductor N connecting between the filter ground terminal 5f and the load neutral terminal 3d.

(3) Disconnect the first segment N1 of the neutral conductor N which is connected between the filter ground terminal 5f of the zero-sequence filter transformer 5 and the source ground terminal 2e of the source transformer 2.

(4) Move the system ground point G from the grounded-neutral source transformer 2 to the zero-sequence filter transformer 5, which is accomplished by removing the source neutral connection 2d of the source transformer 2 and installing a filter ground connection 5g from the filter ground terminal 5f of the zero-sequence filter transformer to a new system ground point G1.

(5) Operatively connect a zero-sequence filter transformer protection scheme to the power system for tripping a main circuit breaker 8 or 9 of the power system when an abnormal condition is detected.

An additional step can be added to the process A or process B, which is to replace the second segment N2 of the neutral conductor N by a new neutral conductor of adequate current-carrying capacity to safely carry the full zero-sequence current flowing in that portion of the system.

Figure 6:
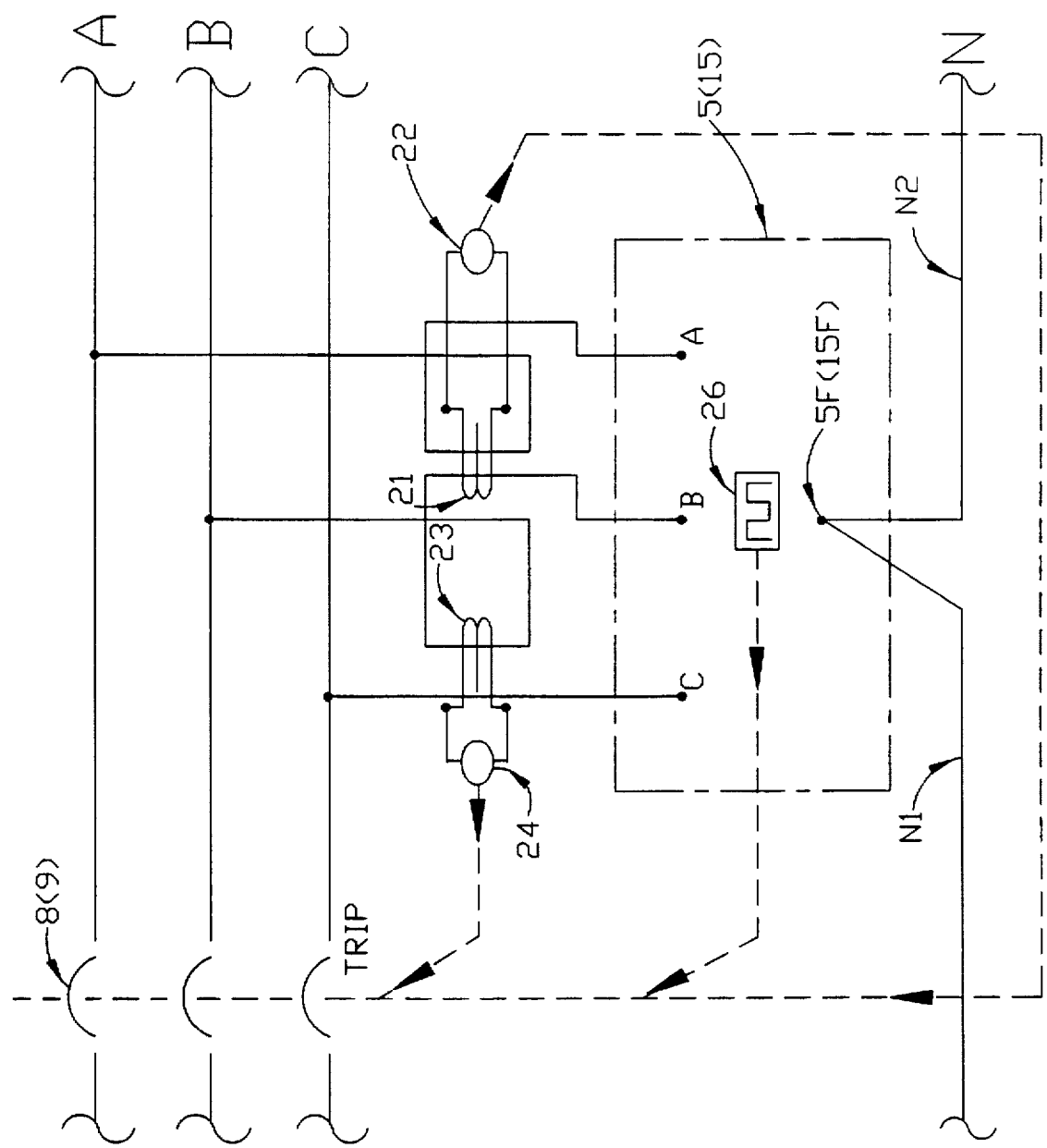
FIG. 6 is a circuit diagram depicting a zero-sequence filter transformer protection scheme applicable to the first or second preferred embodiment according to the present invention.

FIG. 6 depicts a means of protecting the zero-sequence filter transformer 5 or 15 of the above first or second embodiment form internal faults, open circuits and overloads. The arrangement provides for tripping a main circuit breaker 8 or 9 for any such problems associated with the zero-sequence filter transformer 5 or 15. Overload protection is provided by a thermal switch 26 sensitive to internal temperature of the filter transformer 5 or 15. Internal short-circuit and open-circuit protection is provided by two do-nut current transformers 21, 23, each connected to an overcurrent relay 22, 24. The leads for phases A and B are fed through the current transformer 21 such that current through the two leads cancel each other for normal flow of the zero-sequence current. With such connections, any significant current flow to the overcurrent relay 22 will indicate a short circuit or open circuit in windings A or B of the zero-sequence filter transformer 5 or 15. An identical arrangement is provided for phase B and C leads in conjunction with the current transformer 23 and the overcurrent relay 24.

Thus, all three phase windings of the zero-sequence filter transformer 25 are protected. Contacts of the thermal switch 26 and the over-current relays 22, 24 are operatively connected to trip the main circuit breaker 8 or 9 when abnormal conditions are detected. This arrangement has the advantage of switching off the entire 3-phase, 4-wire system whenever the zero-sequence filter transformer 5 or 15 is in trouble. Other protective schemes which independently switch off the zero-sequence filter transformer 5 or 15, create an unsafe condition which may result in dangerous over-voltages during the time the zero-sequence filter transformer 5 or 15 is disconnected and the system is still in operation.

Moreover, the zero-sequence filter transformers 5 or 15 disclosed herein are adapted to withstand the heating effects of all currents, of whatever frequency, flowing in the neutral conductor N.

It should be understood by those skilled in the art that various processes may be applied in moving the ground connection from the source transformer 2 to the zero-sequence filter transformer 5 or 15. Furthermore, the disclosed method for overcurrent protection is the presently-preferred method. However, any equivalent protection schemes operating to trip the system main circuit breaker 8 or 9 may be utilized and still fall within the scope of the present invention.

It should be understood that the power systems disclosed may supply balanced, three-phase loads in addition to the single-phase loads described. Such ungrounded three-phase loads will have the effect of adding balanced, fundamental-frequency currents to those currents evaluated herein.

FIG. 7 illustrates a comparison table A for the performance of the present invention and the prior art most competitive with the present invention. Such prior art as described in the background above consists of the zero-sequence filter transformer with the existing ground and neutral-conductor termination retained at the source transformer neutral. Performance of this prior art and the present invention have been calculated for a typical 3-phase, 4-wire power system, with results summarized below in FIG. 7.

The table A illustrated in FIG. 7 indicates the following improvements for the present invention over the prior art.

Neutral currents from unbalanced loads are eliminated from the source transformer and its neutral circuit, versus 50% remaining for the prior art. Maximum phase current is reduced from 95.8% to 88.4%.

Third harmonic and other triplen harmonics are eliminated from the phase and neutral of the source transformer and its conductors, while 53% of the generated harmonics continue to flow for the prior art.

Also, with the addition of zig-zag transformers, the line-to-ground short-circuit current was found to be altered as follows, as compared to the existing system:

| CHANGE IN SHORT-CIRCUIT CURRENT | |
|---|---|
| Prior Art | Increase 25% |
| Present Invention | Decrease 2% |

Accordingly, the present invention eliminates the flow of zero-sequence current in the source transformer and that portion of the neutral circuit. Damaging triplen harmonics and unbalanced-load currents of all frequencies are prevented from flowing in the source transformer and its neutral circuit.

All zero-sequence current is blocked from the source transformer regardless of the impedance of its filter transformer. Its impedance may therefore be independently selected so as not to increase system short-circuit current. Furthermore, the present invention roughly doubles the effectiveness of the prior art, while avoiding potential serious short-circuit problems. The present invention can be accomplished at a moderate increase in cost.

The present invention is specified to apply to systems supplied from grounded-wye connected source transformers.

The present invention provides overload and short-circuit protection of the filter transformer, arranged to trip the system main circuit breaker since it is unsafe to switch off the filter transformer alone, as the neutral circuit would then be ungrounded and the single-phase loads would be subjected to dangerous over-voltages.

What is claimed is:

1. A transformer protection system for a three-phase, four-wire power system which comprises a grounded-neutral source transformer supplying a system of loads having a plurality of single-phase load elements over a distribution system having three phase and one neutral conductor which is connected to a load neutral terminal of said system of single-phase loads, in which said transformer protection system comprises a zero-sequence filter transformer, which has three phase windings and a filter neutral point, being connected in shunt across said single-phase load elements and being adapted to safely carry continuously, all zero-sequence current flowing in said neutral conductor, wherein said filter neutral point of said zero-sequence filter transformer is grounded and connected to said neutral conductor of said distribution system so as to connect with said load neutral terminal, the connection being made such that said filter neutral point is a sole electrical ground point for said three-phase, four-wire system; and a zero-sequence filter transformer protection scheme operatively connected to trip a main circuit breaker of said power system when an abnormal condition is detected.

2. A transformer protection system, as recited in claim 1, in which said neutral conductor is adapted to have an adequate current-carrying capacity to safely carry all zero-sequence current flowing in that portion of the system.

3. A transformer protective system, as recited in claim 1, in which said zero-sequence filter transformer protection scheme comprises a plurality of sensing devices for detecting overload and short-circuit conditions within said zero-sequence filter transformer and being arranged to trip said main circuit breaker of said power system.

4. A transformer protective system, as recited in claim 1, in which said zero-sequence filter transformer protection scheme comprises a thermal switch for overload protection which is sensitive to internal temperature of said zero-sequence filter transformer, two do-nut current transformers which are connected to two overcurrent relays respectively for internal short-circuit and open-circuit protection, in which said first and said second conduction lines are fed to said zero-sequence filter transformer through said first current transformer in such a manner that the currents flowing through said first and said second conduction lines cancel each other for normal flow of said zero-sequence current, thereby all significant currents flowing to said first overcurrent relay indicating a short circuit or an open circuit in said first or said second phase windings of said zero-sequence filter transformer, wherein said second and said third conduction lines are also fed to said zero-sequence filter transformer through said second current transformer and said second overcurrent relay, so that all contacts of said thermal switch and said two overcurrent relays are operatively connected to trip said main circuit breaker when said abnormal condition is detected.

5. A transformer protection system, as recited in claim 1, in which said zero-sequence filter transformer is a zig-zag transformer.

6. A transformer protection system, as recited in claim 5, in which said neutral conductor is adapted to have an adequate current-carrying capacity to safely carry all zero-sequence current flowing in that portion of the system.

7. A transformer protective system, as recited in claim 6, in which said zero-sequence filter transformer protection scheme comprises a thermal switch for overload protection which is sensitive to internal temperature of said zero-sequence filter transformer, two do-nut current transformers which are connected to two overcurrent relays respectively for internal short-circuit and open-circuit protection, in which said first and said second conduction lines are fed to said zero-sequence filter transformer through said first current transformer in such a manner that the currents flowing through said first and said second conduction lines cancel each other for normal flow of said zero-sequence current, thereby all significant currents flowing to said first overcurrent relay indicate a short circuit or open circuit in said first or said second phase windings of said zero-sequence filter transformer, wherein said second and said third conduction lines are also fed to said zero-sequence filter transformer through said second current transformer and said second overcurrent relay, so that all contacts of said thermal switch and said two overcurrent relays are operatively connected to trip said main circuit breaker when said abnormal condition is detected.

8. A transformer protection system, as recited in claim 1, in which said zero-sequence filter transformer is a wye-delta transformer, wherein a delta-connected secondary winding provides a path for said zero-sequence currents to flow.

9. A transformer protection system, as recited in claim 8, in which said neutral conductor is adapted to have an adequate current-carrying capacity to safely carry all full zero-sequence current flowing in that portion of the system.

10. A transformer protective system, as recited in claim 9, in which said zero-sequence filter transformer protection scheme comprises a thermal switch for overload protection which is sensitive to internal temperature of said zero-sequence filter transformer, two do-nut current transformers which are connected to two overcurrent relays respectively for internal short-circuit and open-circuit protection, in which said first and said second conduction lines are fed to said zero-sequence filter transformer through said first current transformer in such a manner that the currents flowing through said first and said second conduction lines cancel each other for normal flow of said zero-sequence current, thereby all significant currents flowing to said first overcurrent relay indicate a short circuit or open circuit in said first or said second phase windings of said zero-sequence filter transformer, wherein said second and said third conduction lines are also fed to said zero-sequence filter transformer through said second current transformer and said second overcurrent relay, so that all contacts of said thermal switch and said two overcurrent relays are operatively connected to trip said main circuit breaker when said abnormal condition is detected.

11. A converting process of a three-phase, four-wire power system comprising a grounded-neutral source transformer supplying a system of loads having a plurality of single-phase load elements over a distribution system consisting of three phase and one neutral conductor, in which said grounded-neutral source transformer has a source neutral point connected to a source ground point via a source neutral connection to a source ground terminal, from which emanate a source ground connection to said source ground point and said neutral conductor to a load neutral terminal of said system of loads, wherein said process comprises the steps of:

(a) connecting a zero-sequence filter transformer having three segmented phase windings and a filter neutral point, said zero-sequence filter transformer being connected in shunt across said single-phase load elements and being adapted to safely carry continuously all current flowing in said neutral conductor;

(b) connecting said filter neutral point of said zero-sequence filter transformer into said neutral conductor via a filter neutral connection;

(c) disconnecting said source neutral connection from said source neutral point of said grounded-neutral source transformer; and (d) operatively connecting a zero-sequence filter transformer protection scheme to said power system for tripping a main circuit breaker of said power system when an abnormal condition is detected.

12. A converting process, as recited in claim 11, further comprising a step (e) of replacing said neutral conductor, between said filter neutral point and said single-phase load elements, by a new neutral conductor of adequate current-carrying capacity to safely carry the full zero-sequence current flowing in that portion of said power system.

13. A converting process, as recited in claim 11, in which said zero-sequence filter transformer is a zig-zag transformer.

14. A converting process, as recited in claim 11, in which said zero-sequence filter transformer is a wye-delta transformer having a delta-connected secondary winding which provides a path for said zero-sequence currents to flow.

15. A converting process, as recited in claim 11, in which said zero-sequence filter transformer protection scheme comprises a thermal switch for overload protection which is sensitive to internal temperature of said zero-sequence filter transformer, two do-nut current transformers which are connected to two overcurrent relays respectively for internal short-circuit and open-circuit protection, in which said first and said second conduction lines are fed to said zero-sequence filter transformer through said first current transformer in such a manner that the currents flowing through a first and a second conduction lines of said distribution system cancel each other for normal flow of said zero-sequence current, thereby all significant currents flowing to said first overcurrent relay indicate a short circuit or open circuit in said first or said second phase windings of said zero-sequence filter transformer, wherein said second and a third conduction lines are also fed to said zero-sequence filter transformer through said second current transformer and said second overcurrent relay, so that all contacts of said thermal switch and said two overcurrent relays are operatively connected to trip said main circuit breaker when said abnormal condition is detected.

16. A converting process of a three-phase, four-wire power system comprising a grounded-neutral source transformer supplying a system of loads having a plurality of single-phase load elements over a distribution system consisting of three phase and one neutral conductor, in which said grounded-neutral source transformer has a source neutral point connected to ground via a source neutral connection to a source ground terminal, from which emanate a source ground connection to said source ground point and said neutral conductor to a load neutral terminal of said system of loads, wherein said process comprises the steps of:

(a) connecting a zero-sequence filter transformer having three segmented phase windings and a filter neutral point, said filter transformer being connected in shunt across said single-phase load elements and being adapted to safely carry continuously all current flowing in said neutral conductor;

(b) connecting said filter neutral point of said zero-sequence filter transformer into (c) disconnecting a segment of said neutral conductor connecting between said filter neutral terminal of said zero-sequence filter transformer and said source neutral terminal of said source transformer;

(d) moving said system ground point from said grounded-neutral source transformer to said zero-sequence filter transformer, which is accomplished by removing said source neutral connection of said source transformer and connecting said filter neutral terminal of said zero-sequence filter transformer to a second system ground point via a filter ground connection; and (e) operatively connecting a zero-sequence filter transformer protection scheme to said power system for tripping a main circuit breaker of said power system when an abnormal condition is detected.

17. A converting process, as recited in claim 16, further comprising a step (f) of replacing said neutral conductor, between said filter neutral terminal and said single-phase load elements, by a new neutral conductor of adequate current-carrying capacity to safely carry the full zero-sequence current flowing in that portion of said power system.

18. A converting process, as recited in claim 16, in which said zero-sequence filter transformer is a zig-zag transformer.

19. A converting process, as recited in claim 16, in which said zero-sequence filter transformer is a wye-delta transformer having a delta-connected secondary winding which provides a path for said zero-sequence currents to flow.

20. A converting process, as recited in claim 16, in which said zero-sequence filter transformer protection scheme comprises a thermal switch for overload protection which is sensitive to internal temperature of said zero-sequence filter transformer, two do-nut current transformers which are connected to two overcurrent relays respectively for internal short-circuit and open-circuit protection, in which said first and said second conduction lines are fed to said zero-sequence filter transformer through said first current transformer in such a manner that the currents flowing through a first and a second conduction lines of said distribution system cancel each other for normal flow of said zero-sequence current, thereby all significant currents flowing to said first overcurrent relay indicate a short circuit or open circuit in said first or said second phase windings of said zero-sequence filter transformer, wherein said second and a third conduction lines are also fed to said zero-sequence filter transformer through said second current transformer and said second overcurrent relay, so that all contacts of said thermal switch and said two overcurrent relays are operatively connected to trip said main circuit breaker when said abnormal condition is detected.

* * * * *